(12) United States Patent
Cloft et al.

(10) Patent No.: US 7,766,280 B2
(45) Date of Patent: Aug. 3, 2010

(54) INTEGRAL SUCTION DEVICE WITH ACOUSTIC PANEL

(75) Inventors: Thomas G. Cloft, Glastonbury, CT (US); Richard H. Wiley, East Hartford, CT (US)

(73) Assignee: United Technologies Corporation, Hartford, CT (US)

( * ) Notice: Subject to any disclaimer, the term of this patent is extended or adjusted under 35 U.S.C. 154(b) by 379 days.

(21) Appl. No.: 11/754,518

(22) Filed: May 29, 2007

(65) Prior Publication Data

US 2008/0296439 A1  Dec. 4, 2008

(51) Int. Cl.
*B64C 21/06* (2006.01)

(52) U.S. Cl. ............... 244/208; 244/209

(58) Field of Classification Search ........... 244/209, 244/204, 198, 54, 53 B; 137/15.1, 15.2; 60/226.1

See application file for complete search history.

(56) References Cited

U.S. PATENT DOCUMENTS

| | | | |
|---|---|---|---|
| 3,702,121 A * | 11/1972 | Millman | 137/15.1 |
| 4,156,344 A | 5/1979 | Cuthbertson et al. | |
| 4,240,250 A | 12/1980 | Harris | |
| 4,452,335 A | 6/1984 | Mathews et al. | |
| 4,749,150 A | 6/1988 | Rose et al. | |
| 4,972,672 A | 11/1990 | Sanderson et al. | |
| 4,993,663 A | 2/1991 | Lahti et al. | |
| 5,000,399 A | 3/1991 | Readnour et al. | |
| 5,059,093 A | 10/1991 | Khalid et al. | |
| 5,136,837 A | 8/1992 | Davison | |
| 5,263,667 A * | 11/1993 | Horstman | 244/209 |
| 5,535,967 A * | 7/1996 | Beauchamp et al. | 244/209 |
| 5,618,363 A | 4/1997 | Mullender et al. | |
| 5,702,231 A * | 12/1997 | Dougherty | 415/119 |
| 5,743,488 A * | 4/1998 | Rolston et al. | 244/53 B |
| 5,743,493 A * | 4/1998 | McCaughan | 244/130 |
| 5,934,611 A * | 8/1999 | Tindell et al. | 244/53 B |
| 6,122,892 A | 9/2000 | Gonidec et al. | |
| 6,179,251 B1 | 1/2001 | Tindell et al. | |
| 6,428,271 B1 | 8/2002 | Ress, Jr. et al. | |
| 6,634,595 B2 | 10/2003 | Koncsek et al. | |
| 6,752,358 B1 | 6/2004 | Williams et al. | |
| 6,942,181 B2 | 9/2005 | Dionne | |
| 6,971,229 B2 | 12/2005 | Lair | |
| 7,048,230 B2 | 5/2006 | Meyer | |
| 2003/0150962 A1* | 8/2003 | Orban | 244/209 |
| 2006/0024154 A1* | 2/2006 | Costa et al. | 415/170.1 |

* cited by examiner

*Primary Examiner*—Tien Dinh
(74) *Attorney, Agent, or Firm*—Carlson, Gaskey & Olds

(57) ABSTRACT

An inlet flow control system disposed within a nacelle includes a panel on an inner surface of that nacelle. The panel includes a noise attenuation layer that dissipates noise energy. A vacuum source generates a pressure differential across the noise attenuation layer for drawing airflow through the panel and away from an inner surface of the nacelle.

15 Claims, 3 Drawing Sheets

INTEGRAL SUCTION DEVICE WITH ACOUSTIC PANEL

BACKGROUND OF THE INVENTION

This invention generally relates to an air inlet control system for a gas turbine engine.

Operation of a gas turning engine requires intake of air for the combustion process. Incoming air is directed into the engine by a nacelle that defines a leading edge and an intake opening for incoming air. During most operating conditions air flow along the interior surface of the nacelle is turbulent resulting in a thin boundary layer. However, in some instances such as during low speed high power operation and high angle of attack, local flow fields result in an increase in boundary layer thickness along the surface of the nacelle. At certain airflows the thickened boundary layer can separate from the inner surface of the nacelle creating vortices and non-uniform air flows. These non-uniform air flows and vortices hamper performance of the gas turbine engine.

Accordingly, it is desirable to develop and design a system that prevents build-up of boundary layer and potential separation of air flow along the inner surface of a nacelle.

SUMMARY OF THE INVENTION

An example nacelle includes a noise attenuation panel in communication with air flowing along an inner surface in communication with a vacuum source to draw air through the noise attenuation panel.

A nacelle for a gas turbine engine defines an inner surface that includes a noise attenuation layer covered by a face sheet. The face sheet includes a plurality of holes to communicate sound energy along with airflow into the noise attenuation layer. A back sheet supports the noise attenuation layer in the nacelle and also includes a plurality of holes. A vacuum generating device creates a pressure differential across the noise attenuation panel for pulling airflow through the noise attenuation layer and away from the inner surface of the nacelle structure. Drawing air away from the inner surface of the nacelle prevents separation of the airflow from the inner surface. Maintaining airflow along the inner surface of the nacelle prevents formation of undesirable airflow characteristics that can degrade engine performance.

Accordingly, the example inlet control system provides stability of flow adjacent an inner surface of the nacelle structure.

These and other features of the present invention can be best understood from the following specification and drawings, the following of which is a brief description.

DETAILED DESCRIPTION OF THE PREFERRED EMBODIMENT

Figure 1:
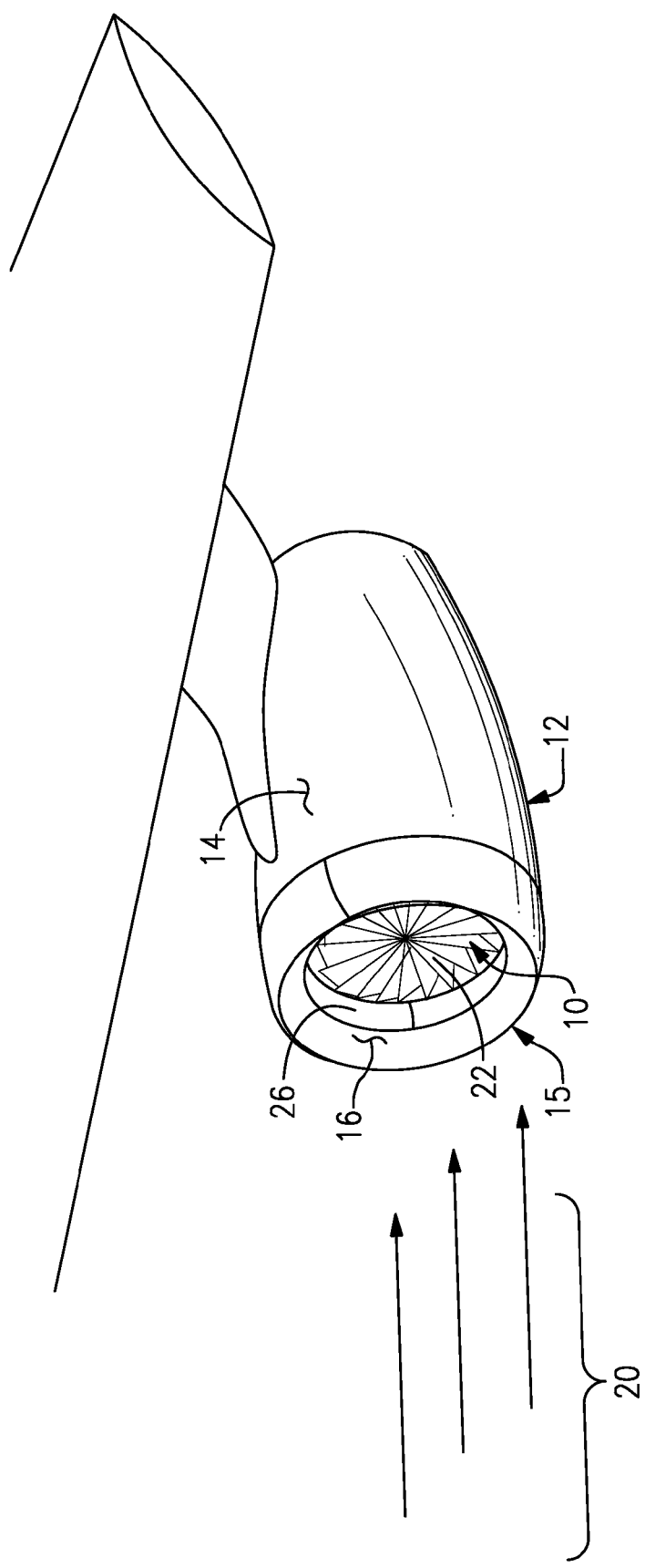
FIG. 1 is a schematic of an example engine nacelle.

Referring to FIG. 1, a gas turbine engine assembly 10 is disposed within a nacelle 12. The nacelle 12 includes an outer surface 14 and an inner surface 16. A leading edge 15 defines an inlet surface for airflow 20. Air flow 20 into the nacelle 12 is directed towards a fan 22 of the gas turbine engine assembly 10. The inner surface 16 is comprised of a plurality of panels 26 that provide for the attenuation of sound energy generated by the gas turbine engine 10. Although an under wing mounted nacelle 12 is illustrated by way of example, other nacelle mounting configurations such as for example fuselage mounted, over wing mounted, and even embedded within a fuselage or wing, will also benefit from the disclosed features.

Figure 2:
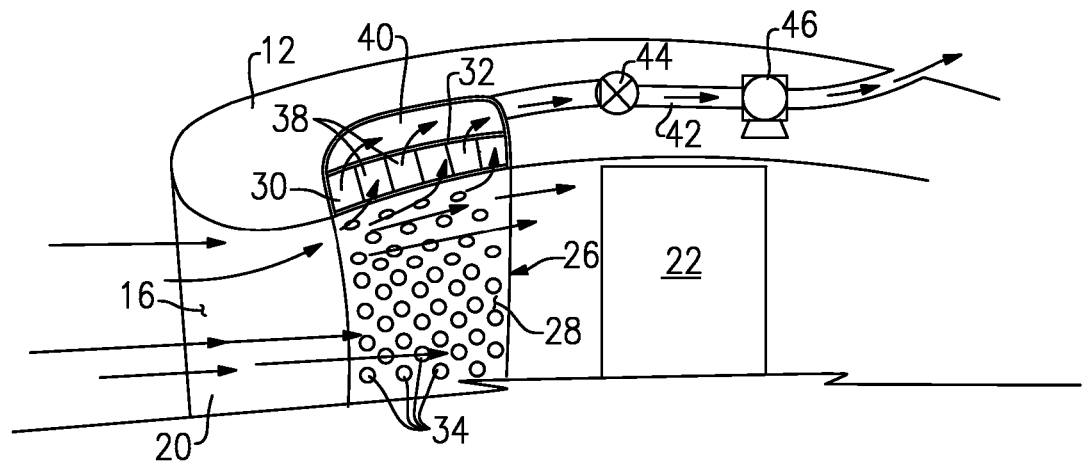
FIG. 2 is a schematic of a cross-section of an engine nacelle.

Referring to FIG. 2, the example nacelle 12 includes a panel 26 comprised of a face sheet 28 that covers a noise attenuation layer 30. The noise attenuation layer is comprised of a plurality of cells 38. The cells 38 provide for the dissipation of sound energy that is communicated through the face sheet 28. Airflow 20 into the nacelle 12 is partially sucked through the panel 26 and exhausted out of nacelle 12 away from the inner surface 16.

The removal of a portion of the airflow 20 increases stability to prevent separation of airflow from the inner surface 16. The panel 26 includes the face sheet 28 that includes a plurality of openings 34. The plurality of openings 34 communicate sound energy along with air through to the noise attenuation layer 30. The noise attenuation layer 30 is supported by a back sheet 32. The back sheet 32 also includes a plurality of holes and is in communication with a plenum 40. The plenum 40 is in turn in communication with a passage 42 that includes a control valve 44 and a vacuum source. In the illustrated example the vacuum source comprises a vacuum pump 46. The vacuum pump 46 creates a pressure differential across the panel 26 that draws in a portion of the airflow 20. Other vacuum sources such as an ejector or other device or method that generates a desired pressure differential.

A control valve 44 is included in the passage 42 between the vacuum pump 46 and the plenum 40. The example plenum 40 is disposed on a back side or non-airflow path side of the panel 26. The plenum 40 is maintained at a desired negative pressure by the vacuum pump 46 that generates the desired pressure differential in order to draw a portion of the airflow 20 therethrough.

The control valve 44 can vary or shut off airflow through the passage 42. Accordingly, airflow through the panel 26 can be tailored to meet specific operation requirements. In some operating conditions, the control valve 44 is closed to prevent airflow through the panel 26. The specific portion of airflow 20 that is drawn through the panel 26 will vary according to specific engine and airplane operation. Accordingly, the control valve 44 is variably adjustable in order to tailor the pressure differential communicated through the back side of the panel 26 to facilitate the desired control of the inlet airflow 20. During other operating conditions, with the control valve 44 in the closed position, the panel 26 continues to perform the noise attenuation function.

Figure 3:
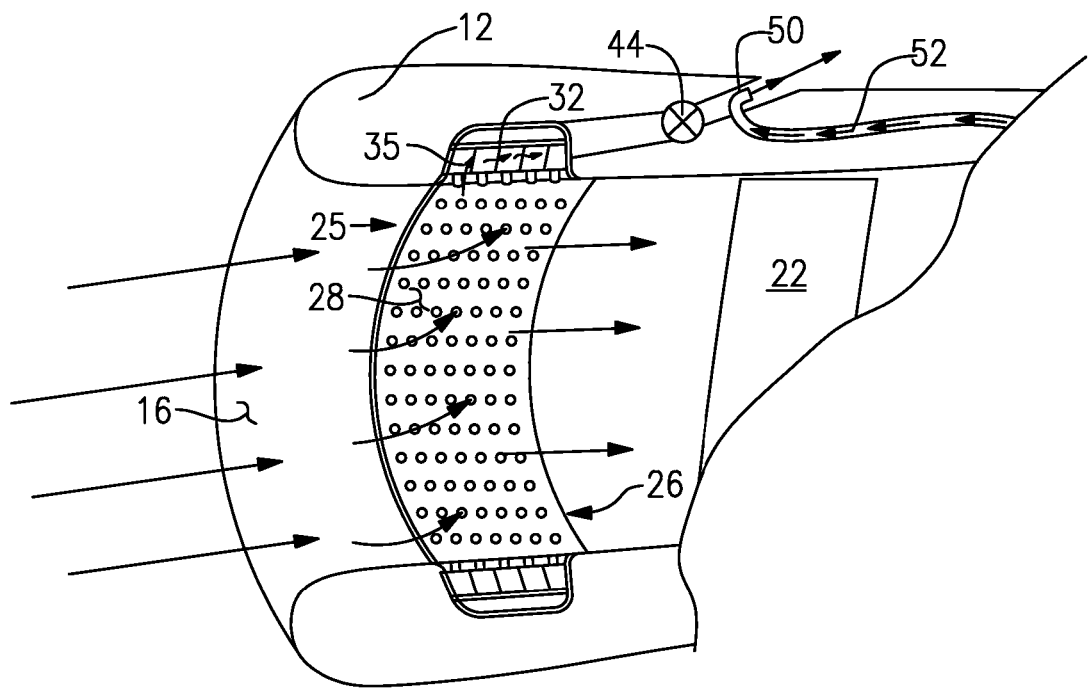
FIG. 3 is another example cross-section of an engine nacelle.

Referring to FIG. 3, another example nacelle structure 12 includes a panel 26 that has the face sheet 28 and the back sheet 32. In this example, no separate plenum is disposed at a back side of the panel 26. The example noise attenuation layer 35 includes openings between each cell such that the noise attenuation layer 35 performs the function of a plenum by communicating the negative pressure required to draw air therethrough.

In this example, a negative pressure is generated and is communicated into the noise attenuation layer 35 of the example panel 25 by an ejector 50 that is supplied with high speed air 52 from a portion of the gas turbine engine assembly 10 (not shown). The ejector 50 communicates the high speed airflow 52 to the rear of the panel 26 through the passage 42.

This high speed airflow generates the desired negative pressure through the noise attenuation layer 25 that is required to draw the desired amount of airflow 20 into the panel 26.

As appreciated, in addition to the disclosed example vacuum pump 46 and ejector 50, other devices and methods for generating the desired pressure differential required to draw airflow through the panel are also within contemplation for use with the disclosed example inlet flow control system.

Figure 4:
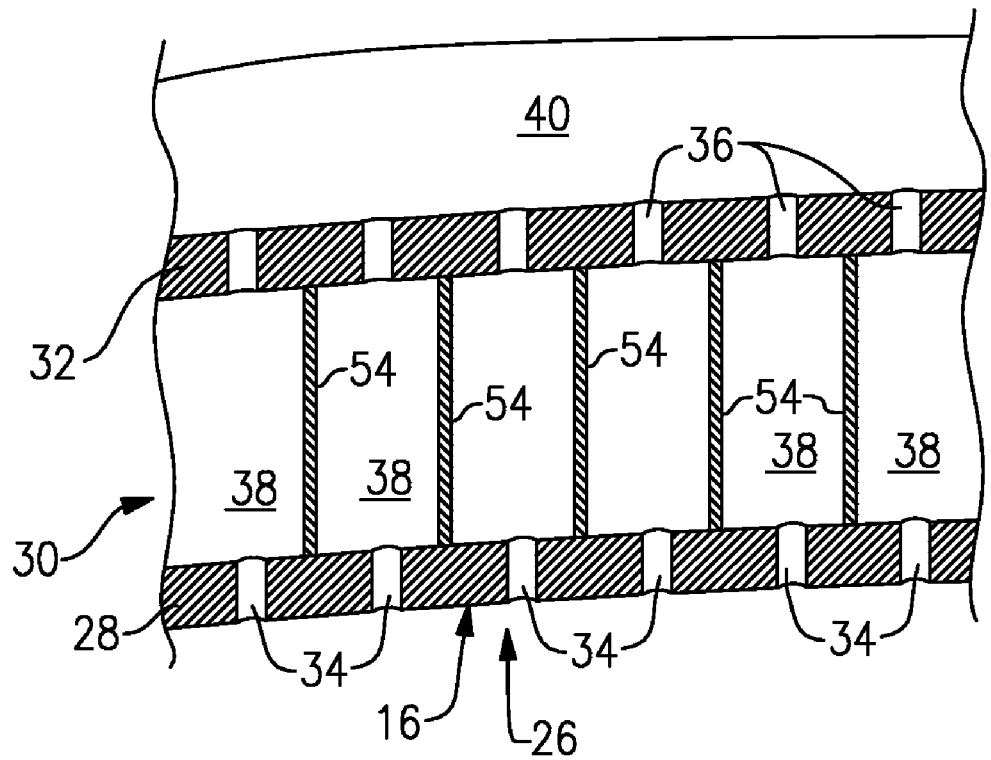
FIG. 4 is an enlarged cross-sectional view of an example noise attenuation structure.

Referring to FIG. 4, the noise attenuation layer 30 includes a plurality of cells 38 that are defined by a plurality of walls 54 that are disposed transversely to the inner surface 16. The plurality of cells 38 are covered by the face sheet 28 that includes the plurality of openings 34 that communicate with at least one of the cells 38. Each of the cells 38 is in communication with at least one of the plurality of openings within the face sheet 34.

The back sheet 36 includes a plurality of openings 36 that allow air to flow there through. Air flows through the panel 26 and into the plenum 40. The plenum 40 is in communication with the vacuum source 46 to create the desired pressure differential for drawing the desired amount of airflow 20 into and away from the inner surface 16.

Figure 5:
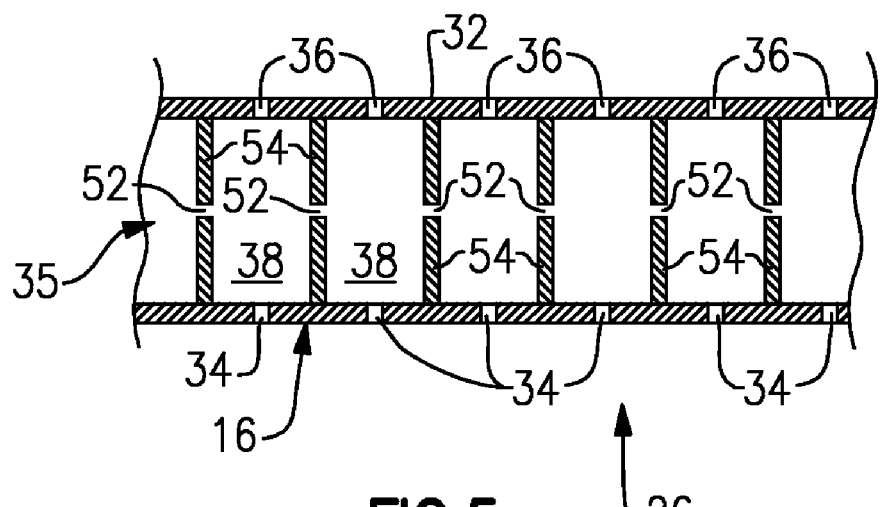
FIG. 5 is another cross-sectional view of another example noise attenuation structure.

Referring to FIG. 5, another example noise attenuation layer 35 includes a plurality of cells 38 and also a plurality of walls 54 that include holes 52 that communicate between the plurality of cells 38. No plenum is provided as the noise attenuation layer 35 performs the function of a plenum to communicate a negative pressure required to draw airflow away from the inner surface. The cross holes 52 provide for cross flow between the plurality of cells 38 that provide a substantially uniform pressure within the noise attenuation layer 35.

Accordingly, the example noise attenuation panel 26 provides for the removal of some portion of airflow through the inner surface 16 of the nacelle 12 to control and stabilize inlet flow to the gas turbine engine assembly. Further, although a preferred embodiment of this invention has been disclosed, a worker of ordinary skill in this art would recognize that certain modifications would come within the scope of this invention. For that reason, the following claims should be studied to determine the true scope and content of this invention.

What is claimed is:

1. An inlet flow control system for a nacelle comprising:
a panel defining a portion of an interior surface of the nacelle, wherein said panel comprises a noise attenuation layer including a plurality of cells for dissipating noise energy within the nacelle, a face sheet including a plurality of openings for communicating noise energy through to the plurality of cells, and a back sheet supporting the plurality of cells and including openings in communication with the plurality of cells, wherein each of the plurality of cells include uninterrupted solid walls extending between the face sheet and the back sheet;
a plenum in communication with the back sheet and each of the openings in the back sheet that correspond to each of the plurality of cells
a vacuum source in communication with said plenum and generating a pressure differential desired to draw air through said panel and away from the interior surface of the nacelle.

2. The system as recited in claim 1, wherein said panel comprises a face sheet disposed over said noise attenuation layer, wherein said face sheet includes a plurality of openings for communicating noise energy through to said noise attenuation layer.

3. The system as recited in claim 1, wherein said noise attenuation layer comprises a plurality of cells defined by a plurality of walls disposed transverse to the interior surface of the nacelle.

4. The system as recited in claim 3, wherein said plurality of walls include openings for communicating air between the plurality of cells.

5. The system as recited in claim 3, including a back sheet supporting the noise attenuation layer, wherein said back sheet includes a plurality of openings providing communication with said vacuum source.

6. The system as recited in claim 1, wherein said vacuum source comprises a vacuum pump.

7. The system as recited in claim 1, wherein said vacuum source comprises an ejector.

8. The system as recited in claim 1, including a passage for exhausting air drawn through said panel flowing along the inner surface of the nacelle.

9. A nacelle for a gas turbine engine comprising:
an intake opening for directing air to the gas turbine engine;
an inner surface including a noise attenuation panel including a plurality of cells covered on the inner surface by a face sheet including a plurality of openings, and supported on by a back sheet including a plurality of openings corresponding to each of the plurality of cells, the face sheet in communication with air flowing along said inner surface;
a plenum defining an open cavity disposed along the back sheet that is in communication with each of the openings within the back sheet; and
a vacuum source for generating a pressure differential that is in communication with the plenum for drawing a part of air flow along said inner surface through said noise attenuation panel.

10. The nacelle as recited in claim 9, wherein said noise attenuation panel comprises a plurality of cells covered by a face sheet, wherein said face sheet includes a plurality of openings for communicating sound energy and air flow to said plurality of cells.

11. The nacelle as recited in claim 10, wherein said noise attenuation panel comprises a plenum in communication with said vacuum source.

12. The nacelle as recited in claim 10, wherein said noise attenuation panel includes a back panel for supporting said plurality of cells, said back panel including a plurality of openings in communication with said vacuum source.

13. The nacelle as recited in claim 12, including a plenum disposed within said nacelle and in communication with said back panel.

14. The nacelle as recited in claim 13, including a passage in communication with said plenum for exhausting air drawn through said noise attenuation panel away from said inner surface.

15. The nacelle as recited in claim 14, wherein the passage comprises an outlet open to an exterior surface of the nacelle.

* * * * *